United States Patent
Aiura

(10) Patent No.: US 8,289,001 B2
(45) Date of Patent: *Oct. 16, 2012

(54) BATTERY CHARGING CIRCUIT AND BATTERY CHARGER

(75) Inventor: Masami Aiura, Sendai (JP)

(73) Assignee: Freescale Semiconductor, Inc., Austin, TX (US)

( * ) Notice: Subject to any disclaimer, the term of this patent is extended or adjusted under 35 U.S.C. 154(b) by 284 days.

This patent is subject to a terminal disclaimer.

(21) Appl. No.: 12/780,943

(22) Filed: May 17, 2010

(65) Prior Publication Data

US 2010/0301811 A1    Dec. 2, 2010

(30) Foreign Application Priority Data

May 26, 2009   (JP) .................................. 2009-126558

(51) Int. Cl.
*H01M 10/46* (2006.01)
(52) U.S. Cl. ......................................................... 320/160
(58) Field of Classification Search .................. 320/107, 320/125, 134, 136, 160, 162
See application file for complete search history.

(56) References Cited

U.S. PATENT DOCUMENTS

| | | | |
|---|---|---|---|
| 4,233,553 A * | 11/1980 | Prince et al. ................... | 320/146 |
| 4,341,988 A | 7/1982 | Small | |
| 4,418,310 A | 11/1983 | Bollinger | |
| 6,297,617 B1 | 10/2001 | Aoyama | |
| 2003/0090238 A1 | 5/2003 | Wolin et al. | |
| 2005/0184705 A1 * | 8/2005 | Gawell et al. ................. | 320/160 |
| 2007/0257645 A1 * | 11/2007 | Nishino ......................... | 323/276 |
| 2008/0174253 A1 * | 7/2008 | Noda ............................. | 323/312 |
| 2009/0058363 A1 | 3/2009 | Platania | |

FOREIGN PATENT DOCUMENTS

| | | |
|---|---|---|
| JP | 08-237880 A | 9/1996 |
| JP | 9-233707 A | 9/1997 |
| JP | 10-334360 A | 12/1998 |
| JP | 2007-159292 A | 6/2007 |

* cited by examiner

*Primary Examiner* — Edward Tso

(74) *Attorney, Agent, or Firm* — Charles Bergere

(57) ABSTRACT

A battery charging circuit and a battery charger that stabilizes operation when switching between charging modes. The battery charging circuit includes first and second transistors that form a current mirror circuit with an output transistor. The source terminal of the first transistor is connected to a first resistor, and the source terminal of the second transistor is connected to a second resistor. Each source terminal is connected to a switch circuit, which controls switching between a trickle charge mode and a fast charge mode. The supply of current to the first and second resistors from the discrete transistors reduces the difference in phase lag resulting from the CR time constant and stabilizes operation in the trickle charge and the fast charge modes.

5 Claims, 4 Drawing Sheets

BATTERY CHARGING CIRCUIT AND BATTERY CHARGER

BACKGROUND OF THE INVENTION

The present invention relates to a battery charging circuit and a battery charger used to charge a battery.

Rechargeable batteries, such as lithium ion batteries, are often used in electronic devices. When charging such a battery with a charger, charging must be performed within a voltage range specified for the particular battery type. A charge voltage that is lower than the specified range will decrease the battery charge capacity, while a charge voltage that is higher than the specified range will stress the battery and drastically decrease the charge capacity of the battery. Thus, the charger must be able to output a stable voltage. The charge current also has an upper limit. For a lithium ion battery, for example, since the charge voltage range is narrow, the current received from the charger also has an upper limit restriction.

Japanese Laid-Open Patent Publication No. 8-237880 (page 1, FIG. 1) describes a charger in which the input current from a charging power supply is stabilized by first and second current stabilization circuits, which respectively output a large current and a small current. A switching circuit first activates the first current stabilization circuit and charges a battery with the large current. As the battery voltage reaches a predetermined value and approaches a fully charged state, the switching circuit deactivates the first current stabilization circuit and activates the second current stabilization circuit to continue charging with a small current.

Japanese Laid-Open Patent Publication No. 9-233707 (page 1, FIG. 1) describes a charger that can switch modes. In this charger, a switching circuit activates first and second current stabilization circuits and charges a battery with a large current. As the battery voltage reaches a predetermined value, the switching circuit deactivates the second current stabilization circuit to continue charging with just the activated first current activation circuit.

Referring to FIGS. 4A and 4B, a charging circuit for a lithium ion battery that performs charging in two modes, namely, a trickle charge mode and a fast charge mode, is shown. The charging circuit enters a trickle charge mode when starting charging. In the trickle charge mode, charging is performed by supplying current having a fixed and relatively small value I1. This gradually increases the voltage of the battery.

When the voltage reaches a predetermined value V1 (mode switching reference voltage), the charging circuit enters a second charging stage, namely, the fast charge mode. In the fast charge mode, charging is performed by supplying current having a fixed and relatively large value I2.

When the voltage reaches a predetermined value V2 in the fast charge mode, charging is performed continuously while the voltage value is maintained (voltage control mode). In this case, the charge current is gradually decreased. Charging ends when the charge current reaches a fixed current value I3.

A charge circuit 10 that performs such charging will now be discussed with reference to FIG. 3.

The battery charge circuit 10 supplies a charge current to a battery 50, which is connected to an external terminal TM1. The battery charge circuit 10 is supplied with voltage V11 from an external terminal TM2.

The external terminal TM2 is connected to the drain of an NMOS transistor 100. The source of the transistor 100 is connected to a resistor 11. Charge current is supplied to the battery 50 via the source of the transistor 100 from the external terminal TM1.

The gate of the transistor 100 is connected to the gate of another NMOS transistor 101. The drain of the transistor 101 is connected to the external terminal TM2 and supplied with the voltage V11. The transistors 100 and 101 form a current mirror circuit.

The source of the transistor 101 is connected to a switch 13. The switch 13 connects the source terminal of the transistor 101 to either one of external terminals TM3 and TM4. A mode switching circuit 40 is connected to the switch 13. The mode switching circuit 40 measures the voltage between the two terminals of the battery 50 and provides the switch 13 with a switching signal for switching from a trickle charge mode to a fast charge mode. When receiving the switching signal, the switch 13 changes connections from the external terminal TM3 to the external terminal TM4.

The external terminals TM3 and TM4 are also connected to another switch 14. The switch 14 is provided with the switching signal from the mode switching circuit 40 and switches connections in synchronism with the switch 13. In this manner, when provided with the switching signal, the switches 13 and 14 each change connections from external terminal TM3 to external terminal TM4.

The external terminal TM3 is connected to a resistor R1, and the external terminal TM4 is connected to a resistor R2. The resistor R1 is used to determine the value of the current in the trickle charge mode and the resistor R2 is used to determine the value of the current in the fast charge mode. Generally, the charge current in the fast charge mode is set to be about twenty times greater than the charge current in the trickle charge mode. Accordingly, the resistance values of the two resistors R1 and R2 are set to have a difference of about twenty. Further, parasitic capacitances C1 and C2 are added to the resistors R1 and R2.

The switch 14 has an output terminal connected to a non-inverting input terminal of an error amplifier 121. The error amplifier 121 has an inverting input terminal supplied with voltage V12, which serves as a current restriction reference voltage. The voltage V12 is used as a reference for limiting or restricting current. The output of the error amplifier 121 is provided to a mixer 120. The mixer 120 restricts the gate voltage supplied to the transistors 100 and 101 when the input voltage exceeds the reference value in the error amplifier 121 or an error amplifier 122.

The mixer 120 is also provided with the output of the error amplifier 122. The error amplifier 122 has an inverting input terminal supplied with voltage V13, which serves as a voltage restriction reference voltage, and a non-inverting input terminal that is supplied with a divisional voltage produced by the resistor 11. The voltage V13 also is used as a reference for restricting voltage.

The output of the mixer 120 is provided to the gates of the transistors 100 and 101. When the divisional voltage produced by the resistor 11 is less than the voltage V13 in the error amplifier 122, the mixer 120 controls the gate voltage of the transistors 100 and 101 in accordance with the output from the error amplifier 121 so as to supply a constant charge current. When the divisional voltage produced by the resistor 11 exceeds the voltage V13, the mixer 120 shifts to the voltage control mode and controls the gate terminal voltage to maintain a constant charge voltage.

In the battery charge circuit 10, the connections of the resistors R1 and R2 are changed to switch from the trickle charge mode to the fast charge mode. This produces a phase lag due to a CR time constant. The time constant of the trickle charge mode is C1·R1, and the time constant of the fast charge mode is C2·R2. In this case, the difference between the two resistance values results in a large difference in the phase lag. The time constants are included in a loop formed by the switch 14, the error amplifier 121, the mixer 120, the transistor 101, and the switch 13. This makes it difficult to perform phase compensation. Thus, oscillation or the like destabilizes the operation of the charge circuit 10. In particular, when designing the battery charge circuit 10 so as to prevent oscillation in the fast charge mode, a phase margin for the trickle charge mode may become small and may produce a large oscillation as shown in FIGS. 4A and 4B.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE INVENTION

Figure 1:
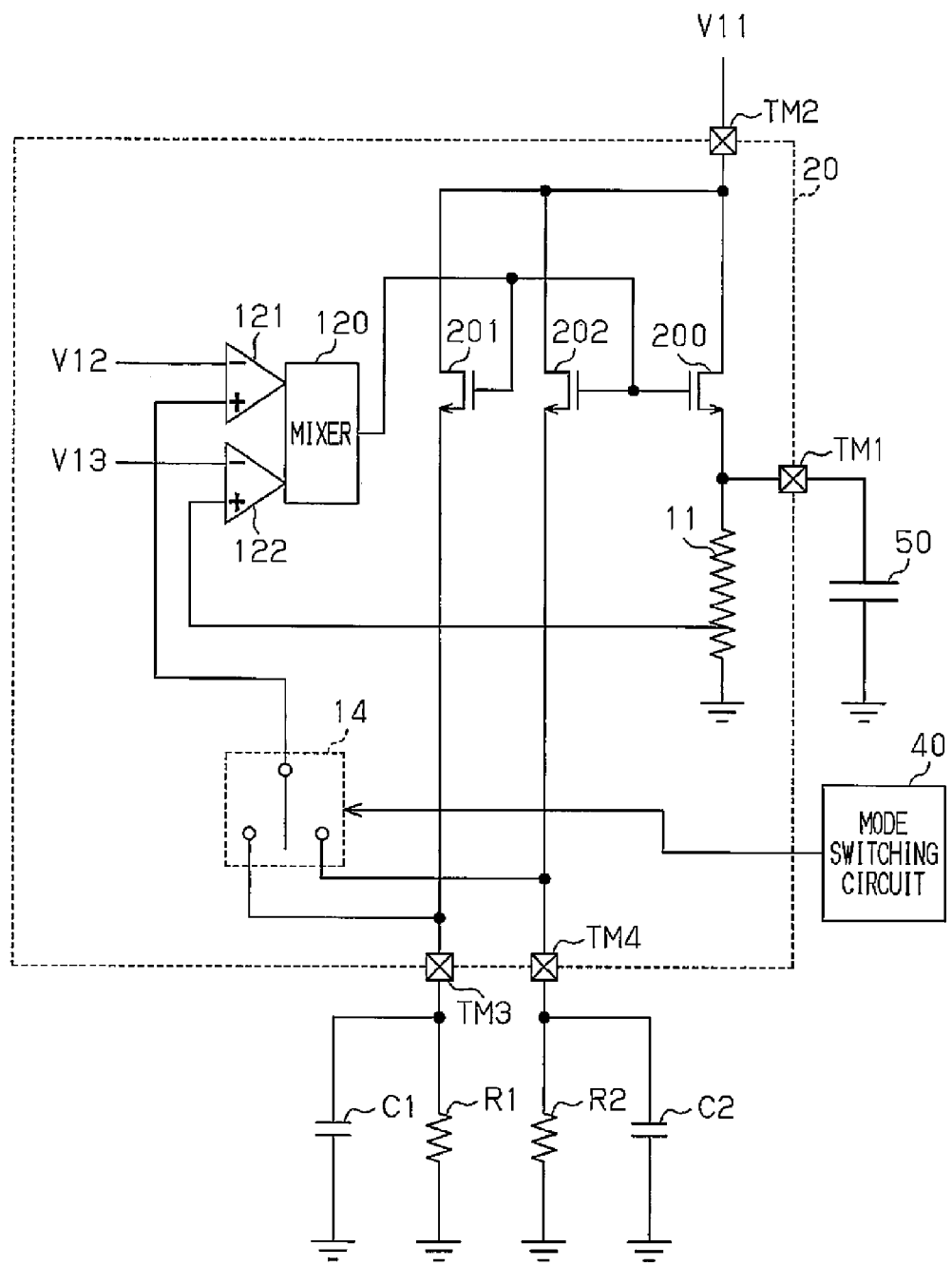
FIG. 1 is a schematic circuit diagram of a battery charge circuit according to one embodiment of the present invention.

The present invention provides a battery charging circuit and battery charger that has stable operation in the trickle charge mode and the fast charge mode.

One aspect of the present invention is a battery charging circuit including an output transistor that supplies a battery with charging current and first and second transistors. The first and second transistors each have a control terminal, which is connected to the control terminal of the other transistor and that of the output transistor, and a current input terminal, which is connected to the current input terminal of the other transistor and that of the output transistor. A first terminal connects a current output terminal of the first transistor to a first resistor, which determines a charging current in a trickle charge mode. A second terminal connects a current output terminal of the second transistor to a second resistor, which determines a charging current in a fast charge mode. A selective switch circuit selectively outputs voltage from the first and second terminals. A first error amplifier compares an output from the switch circuit with a current restriction reference voltage, which is for restricting current. A current amount determination unit determines a gate voltage of the output transistor based on an output of the error amplifier. The first transistor is larger in size than the second transistor.

A further aspect of the present invention is a battery charger including an output transistor that supplies a battery with charging current and first and second transistors. The first and second transistors each have a control terminal, which is connected to the control terminal of the other transistor and that of the output transistor, and a current input terminal, which is connected to the current input terminal of the other transistor and that of the output transistor. A first resistor is connected to a current output terminal of the first transistor to determine a charging current in a trickle charge mode. A second resistor is connected to a current output terminal of the second transistor to determine a charging current in a fast charge mode. A mode switching circuit detects voltage of the battery and outputs a switching signal when the voltage of the battery reaches a mode switching reference voltage. A selective switch circuit selectively outputs current output terminal voltage of the first transistor or current output terminal of the second transistor in accordance with the switching signal. A first error amplifier compares an output from the switch circuit with a current restriction reference voltage, which is for restricting current. A current amount determination unit determines a gate voltage of the output transistor based on an output of the error amplifier. The first transistor is larger in size than the second transistor.

Other aspects and advantages of the present invention will become apparent from the following description, taken in conjunction with the accompanying drawings, illustrating by way of example the principles of the invention.

A battery charging circuit and a battery charger according to one embodiment of the present invention will now be discussed with reference to FIG. 1. The battery charger according to the present invention includes a battery charging circuit 20, a mode switching circuit 40, and resistors R1 and R2.

The battery charging circuit 20 supplies charging current to a battery 50, which is connected to an external terminal TM1. The battery charging circuit 20 is supplied with voltage V11 via an external terminal TM2.

The external terminal TM2 is connected to the drain terminal (current input terminal) of a transistor 200, which functions as an output transistor. The transistor 200 is an N-type MOS transistor. The source terminal (current output terminal) of the transistor 200 is connected to a resistor 11. Charging current is supplied to the battery 50 via the source terminal of the transistor 200 from the external terminal TM1.

The gate terminal (control terminal) of the transistor 200 is connected to the gate terminal of a transistor 201, which functions as a first transistor, and the gate terminal of a transistor 202, which functions as a second transistor. The transistors 201 and 202 are also N-type MOS transistors. The drain terminals of the transistors 201 and 201 are connected to the external terminal TM2 and supplied with the voltage V11. The transistors 200, 201, and 202 form a current mirror circuit.

When the transistors 200, 201, and 202 have sizes represented by N:M:1 (1<M<N), for example, N is 4000, and M is 10. That is, the transistor 201 is larger in size than the transistor 202.

The source terminal of the transistor 201 is connected to an external terminal TM3 (first terminal). The source terminal of the transistor 201 is further connected via the external terminal TM3 to a resistor R1, which serves as a first resistor that determines the charging current in the trickle charge mode. The source terminal of the transistor 202 is connected to an external terminal TM4 (second terminal). The source terminal of the transistor 202 is further connected via the external terminal TM4 to a resistor R2, which serves as a second resistor that determines the charging current in the fast charge mode. In the present embodiment, the resistor R1 is set to be two times greater in size than the resistor R2. Due to the size ratio of the transistors 201 and 202, the charging current in the fast charge mode is twenty times greater than the charging current in the trickle charge mode. Parasitic capacitances C1 and C2 are added to the resistors R1 and R2.

The external terminals TM3 and TM4 are connected to a switch circuit 14 (selective switch circuit). The switch circuit 14 is provided with a switching signal from a mode switching circuit 40. The mode switching circuit 40 measures the voltage between the two terminals of the battery 50. When the voltage reaches a mode switching reference voltage, the mode switching circuit 40 provides the switch circuit 14 with a switching signal for switching from the trickle charge mode to the fast charge mode.

The switch circuit 14 is further connected to a non-inverting terminal of an error amplifier 121, which functions as a first error amplifier. When receiving the switching signal, the switch circuit 14 changes connections from the external terminal TM3 to the external terminal TM4. This changes the output of the switch circuit 14 from the source terminal voltage (current output terminal voltage) of the transistor 201 to the source terminal voltage (current output terminal voltage) of the transistor 202.

The error amplifier 121 has an inverting input terminal supplied with voltage V12, which serves as a current restriction reference voltage. The output of the error amplifier 121 is provided to a mixer 120, which functions as a current amount determination unit.

The mixer 120 is also provided with the output of an error amplifier 122, which serves as a second error amplifier. The error amplifier 122 has an inverting input terminal supplied with voltage V13, which serves as a voltage restriction reference voltage, and a non-inverting input terminal, which is supplied with a divisional voltage produced by the resistor 11. The output of the mixer 120 is provided to the gate terminals of the transistors 200, 201, and 202.

The above-described embodiment has the advantages described below.

In the above-described embodiment, the resistor R1 is supplied with current from the transistor 201 in the trickle charge mode. The resistor R2 is supplied with current from the transistor 202 in the fast charge mode. Here, in the circuit structure according to the present invention, the transistors 201 and 202 are represented in size by M:1 (1<M). This increases the value of the current supplied from the transistor 201. Thus, even when the resistor R1 is small, the desired voltage (here, the voltage V12) is maintained at the external terminal TM3. As a result, the time constant of the trickle charge mode may be decreased to reduce the difference from the phase lag of the fast mode. This facilitates phase compensation in the trickle charge mode and fast charge mode and stabilizes operation.

It should be apparent to those skilled in the art that the present invention may be embodied in many other specific forms without departing from the spirit or scope of the invention. Particularly, it should be understood that the present invention may be embodied in the following forms.

In the above-described embodiment, the transistors 200, 201, and 202 are N-type MOS transistors but are not limited to such transistors. For example, P-type MOS transistors or bipolar transistors may also be used. When using a P-type MOS transistor, the source terminal functions as the current input terminal, and the drain terminal functions as a current output terminal. When using a bipolar transistor, the emitter terminal, the base terminal, and the collector terminal respectively function as the current input terminal, the control terminal, and the current output terminal.

In the above-described embodiment, the mode switching circuit 40 is arranged outside the battery charging circuit 20. Instead, the mode switching circuit 40 may be arranged inside the battery charging circuit 20.

Figure 2:
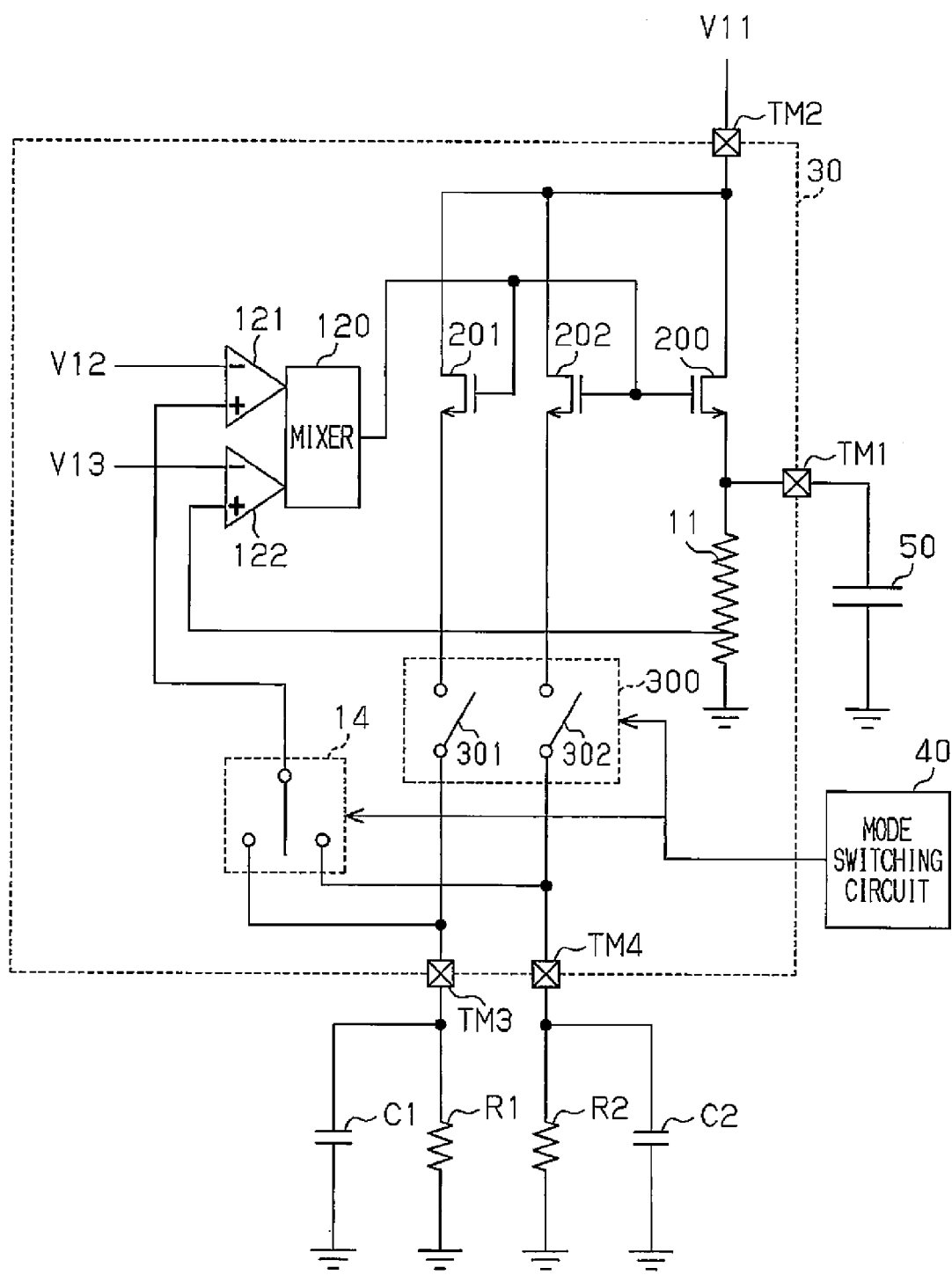
FIG. 2 is a schematic circuit diagram of a battery charge circuit according to another embodiment of the present invention.
Figure 3:
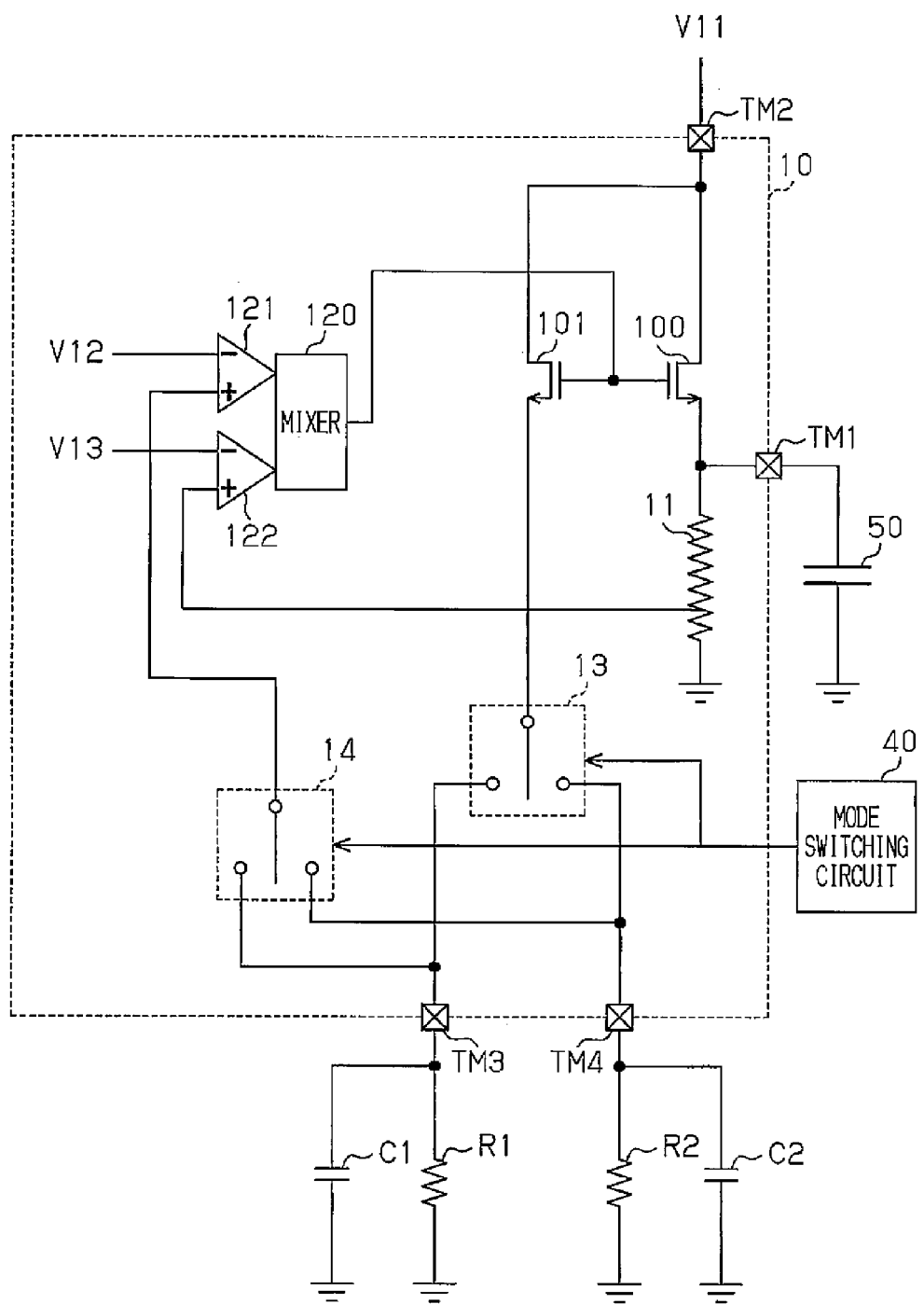
FIG. 3 is a schematic circuit diagram of a conventional battery charging circuit.
Figure 4A:
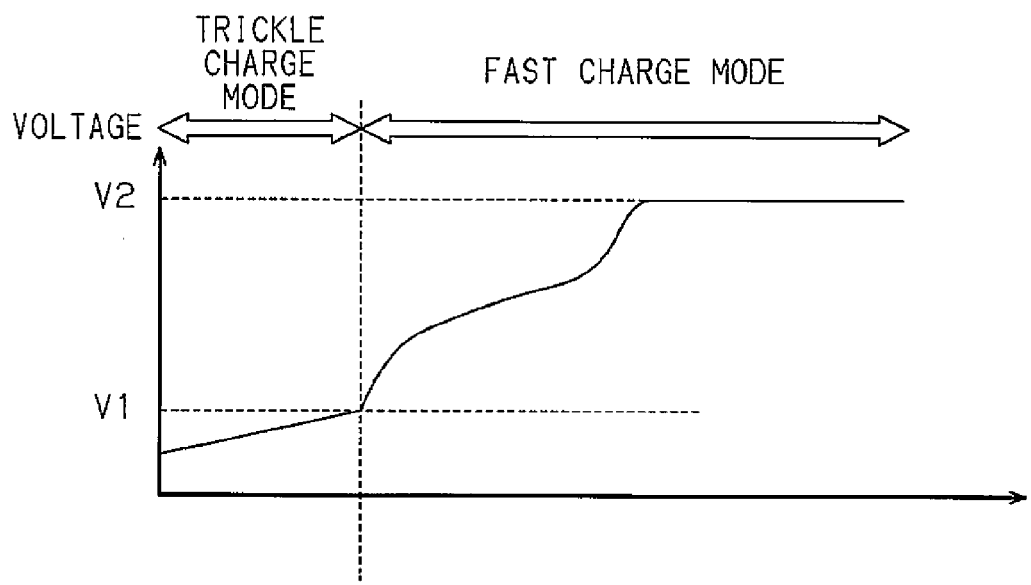
FIG. 4A is a graph showing the voltage behavior when charging a battery.
Figure 4B:
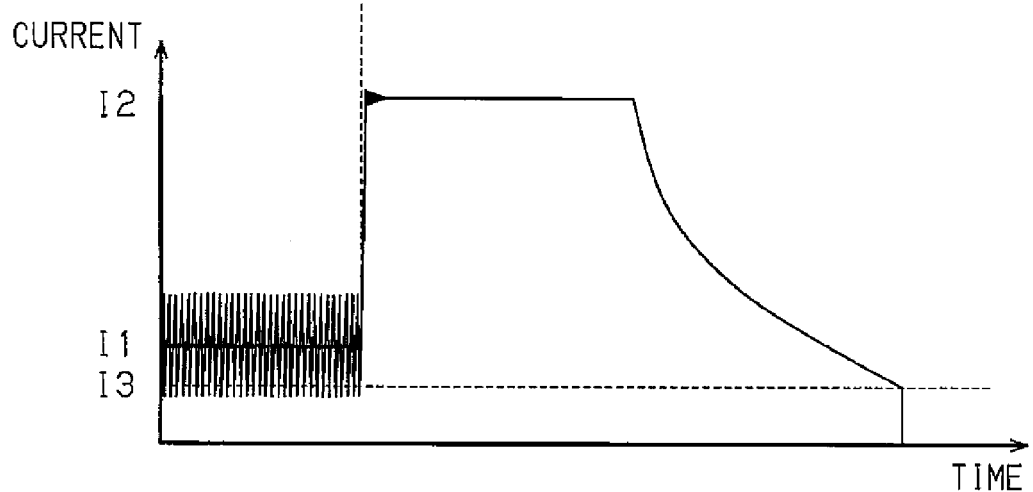
FIG. 4B is a graph showing the current behavior when charging a battery.

In the above-described embodiment, the source terminal of the transistor 201 is connected to the external terminal TM3, and the source terminal of the transistor 202 is connected to the external terminal TM4. In addition, a switch circuit may be arranged between the transistors 201 and 202 and the external terminals TM3 and TM4. Such a structure will now be described with reference to FIG. 2. In this battery charging circuit 30, a switch circuit 300 is arranged between the transistors 201 and 202 and the external terminals TM3 and TM4. The switch circuit 300 includes switches 301 and 302.

More specifically, the switch 301 (first switch circuit) is connected between the transistor 201 and the external terminal TM3. Further, the switch 302 (second switch circuit) is connected between the transistor 202 and the external terminal TM4. The switch 301 closes in the trickle charge mode and opens in the fast charge mode. The switch 302 operates in synchronism with the switch 301 and opens in the trickle charge mode and closes in the fast charge mode. This stops the flow of current in the one of the transistors 201 and 202 that is not used in the present charge mode and reduces power consumption.

In the above-described embodiment, the resistor R1 is connected to the external terminal TM3, and the resistor R2 is connected to the external terminal TM4. However, resistors for controlling the current do not necessarily have to be arranged outside the battery charging circuit 20 and may be arranged inside the battery charging circuit 20.

The present examples and embodiments are to be considered as illustrative and not restrictive, and the invention is not to be limited to the details given herein, but may be modified within the scope and equivalence of the appended claims.

What is claimed is:

1. A battery charging circuit comprising:
   an output transistor that supplies a battery with charging current;
   first and second transistors, each having a control terminal, which is connected to the control terminal of the other transistor and that of the output transistor, and a current input terminal, which is connected to the current input terminal of the other transistor and that of the output transistor;
   a first terminal that connects a current output terminal of the first transistor to a first resistor, which determines a charging current in a trickle charge mode;
   a second terminal that connects a current output terminal of the second transistor to a second resistor, which determines a charging current in a fast charge mode;
   a selective switch circuit that selectively outputs voltage from the first and second terminals;
   a first error amplifier that compares an output from the switch circuit with a current restriction reference voltage, which is for restricting current; and
   a current amount determination unit that determines a gate voltage of the output transistor based on an output of the error amplifier;
   wherein the first transistor is larger in size than the second transistor.

2. The battery charging circuit according to claim 1, wherein the switch circuit is connected to a mode switching circuit that detects voltage of the battery and outputs a switching signal when the voltage of the battery reaches a mode switching reference voltage; and
   the switch circuit changes connection from the first terminal to the second terminal in accordance with the switching signal.

3. The battery charging circuit according to claim 1, further comprising:
   a first switch circuit connected between the current output terminal of the first transistor and the first terminal; and
   a second switch circuit connected between the current output terminal of the second transistor and the second terminal;

wherein the first and second switch circuits are switched in synchronism with the selection of the selective switch circuit.

4. The battery charging circuit according to claim 1, further comprising:
- a resistor having one end connected to a current output terminal of the output transistor and another end connected to ground; and
- a second error amplifier that compares a divisional voltage of the resistor with a voltage restriction reference voltage;
- wherein the current amount determination unit determines the gate voltage based on the comparisons of the first and second error amplifiers.

5. A battery charger comprising:
- an output transistor that supplies a battery with charging current;
- first and second transistors, each having a control terminal, which is connected to the control terminal of the other transistor and that of the output transistor, and a current input terminal, which is connected to the current input terminal of the other transistor and that of the output transistor;
- a first resistor connected to a current output terminal of the first transistor to determine a charging current in a trickle charge mode;
- a second resistor connected to a current output terminal of the second transistor to determine a charging current in a fast charge mode;
- a mode switching circuit that detects voltage of the battery and outputs a switching signal when the voltage of the battery reaches a mode switching reference voltage;
- a selective switch circuit that selectively outputs current output terminal voltage of the first transistor or current output terminal of the second transistor in accordance with the switching signal;
- a first error amplifier that compares an output from the switch circuit with a current restriction reference voltage, which is for restricting current; and
- a current amount determination unit that determines a gate voltage of the output transistor based on an output of the error amplifier;
- wherein the first transistor is larger in size than the second transistor.

* * * * *